Aug. 23, 1932.　　　L. C. SMITH　　　1,873,350
GLASS SECURING DEVICE
Filed March 7, 1930
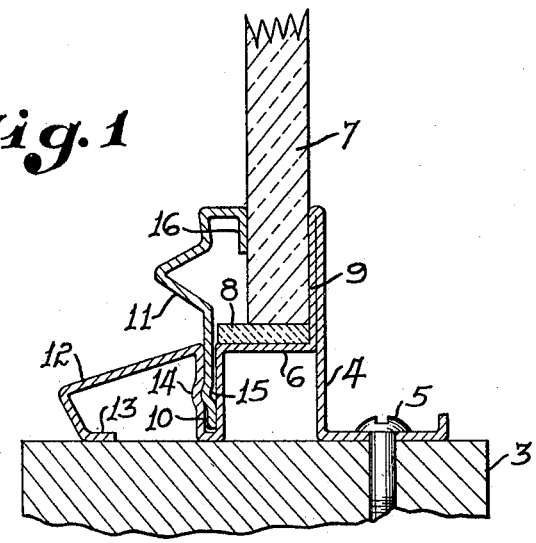
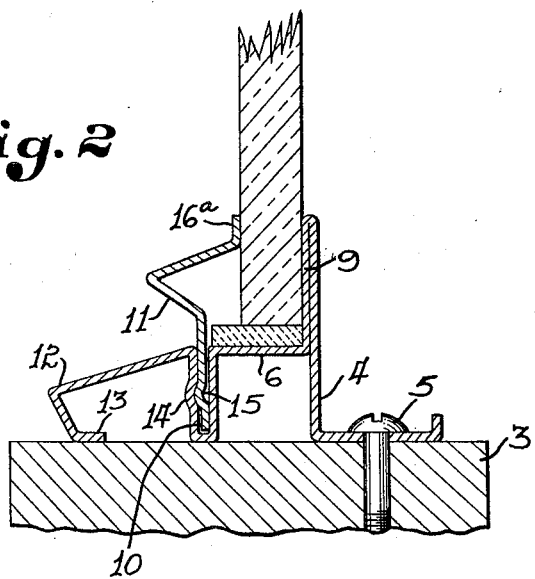
Inventor
Lorne C. Smith
By Owen & Owen
Attorneys Patented Aug. 23, 1932

1,873,350

UNITED STATES PATENT OFFICE

LORNE C. SMITH, OF CHICAGO, ILLINOIS, ASSIGNOR TO ZOURI DRAWN METALS COMPANY, OF CHICAGO HEIGHTS, ILLINOIS, A CORPORATION OF ILLINOIS

GLASS SECURING DEVICE

Application filed March 7, 1930. Serial No. 433,892.

This invention relates to a device for securing glass in a sash or frame, as for example, in a store front construction, casement window, or automobile body or windshield.

The primary object of the invention is to provide a glass securing device of simplified construction, and especially one in which the glass may be easily and quickly clamped in position, preferably without the necessity of using tools, screws or other fastening means except the frame moulding itself. In the present form of the invention, the clamping member engaging one face of the glass has a portion extending across the edge of the glass and formed with a channel in which the other clamping member or moulding is received, the latter being sufficiently resilient so that it may be sprung outwardly as it is inserted longitudinally in the channel and will exert clamping pressure against the glass as soon as it is released.

The construction of the invention will be more specifically explained in connection with the accompanying drawing, in which Figure 1 is a transverse sectional view of one form in which the invention may be embodied.

Figure 2 is a similar view showing a slightly modified form.

The invention is illustrated in connection with a sill or frame 3 to which the rear clamping member 4 may be secured by screws 5 or other suitable means. The member 4 is formed from a blank of suitable non-corrodible metal and has a shoulder 6 to receive the edge of the glass 7 with a suitable cushion 8 therebetween. At the rear edge of the shoulder 6 is a double thick flange 9 presenting a flat face for clamping engagement with the surface of the glass and then extending downwardly and rearwardly to form a channel or gutter in which the screws or suitable attaching means are mounted.

In front of the plane of the glass, the member 4 is formed with a comparatively deep, narrow channel 10, which is adapted to receive the lower edge portion of the front clamping member or moulding 11. In front of the member 11 the rear clamping member 4 is continued as at 12 to present a finished appearance and has a downwardly and rearwardly extending flange 13 to engage the frame or sill 3.

The channel 10 is wide enough so that the lower edge portion of the moulding 11 may slide freely therein, but is formed with a bead or corrugation 14 which mates with a corresponding bead or corrugation 15 extending longitudinally of the moulding 11. Thus the two clamping members 4 and 11 have an interlocking engagement which prevents any relative movement except longitudinally of the channel 10. The moulding 11 is made from spring tempered metal, preferably bronze or copper and is so shaped that its flange 16 exerts a pressure against the face of the glass to clamp it against the face 9 of the rear clamping member, when the moulding 11 is inserted in the position shown in Figure 1. The moulding 11 may therefore be sprung sufficiently to insert it longitudinally into the channel 10 and when released it bears against the glass with the requisite pressure to hold it securely.

In the modification shown in Figure 2 the moulding 11 is formed with an outturned flange 16a which effects the same purpose as the flange 16 in Figure 1.

It will be understood, of course, that the specific construction of the invention may be modified considerably from that shown without departing materially from the scope of the appended claims. It is obvious also that the same may be used in various relations wherever it is desired to secure a sheet or plate of glass or similar material in a frame.

What I claim is:

1. In a device for securing a sheet of glass or the like, a relatively fixed member adapted to be mounted upon a sill or frame and having a surface for engaging one face of the sheet and a rearward extension whereby the member may be attached to said sill or frame, and provided with a channel on the opposite side of the plane of the sheet, and a second member insertable into said channel in a direction substantially parallel to the proximate edge of the sheet and normally engaging the opposite face of the sheet when thus inserted, a wall of said channel and said second member having mating longitudinal corrugations to lock said members against relative transverse movement.

2. A glass securing device comprising an inner pane seating member provided with a flange adapted to engage the face of said glass and a rearwardly extending gutter portion, said member having a pane seating shoulder for supporting said glass, a channel in said member, and an outer resilient pane holding member having an edge engaging in said channel and adapted to contact the other face of said glass for holding the same in place.

3. A glass securing device adapted to be mounted upon a sill or frame comprising a pane seating member bent to provide a shoulder portion for supporting a pane of glass, a flange on one side of said portion adapted to contact a face of a pane of glass and provided with a rearwardly extending portion forming a channel, and a groove on the other side of said portion, means in said channel for attaching said member upon the sill or frame, and a member adapted to engage in said groove and contact the other face of said pane of glass for holding the same in place.

4. A glass securing device adapted to be mounted upon a sill or frame comprising a pane seating member bent to provide a shoulder for supporting a pane of glass, a flange on one side of said shoulder adapted to engage a face of a pane of glass and provided with a downwardly and rearwardly extending portion, and a groove on the other side of said portion, attaching means in said rearwardly extending portion for mounting the member upon the sill or frame, and a removable member adapted to engage in said groove and contact with the other face of said pane, said groove and removable member having means interlocking whereby movement of said member in said groove is limited to a direction substantially parallel to the plane of said glass.

In testimony whereof I have hereunto signed my name to this specification.

LORNE C. SMITH.